(12) United States Patent
Hogg

(10) Patent No.: US 7,431,118 B1
(45) Date of Patent: Oct. 7, 2008

(54) MOTORCYCLE FLOORBOARD APPARATUS

(76) Inventor: Gordon S. Hogg, 16359 W. 10th Ave., Apartment P3, Golden, CO (US) 80401-3792

(*) Notice: Subject to any disclaimer, the term of this patent is extended or adjusted under 35 U.S.C. 154(b) by 381 days.

(21) Appl. No.: 11/297,054

(22) Filed: Dec. 9, 2005

(51) Int. Cl.
*B62D 61/02* (2006.01)

(52) U.S. Cl. .................. 180/219; 280/291; 280/163; 280/164.1; 74/564

(58) Field of Classification Search ............... 180/219; 280/291
See application file for complete search history.

(56) References Cited

U.S. PATENT DOCUMENTS

| | | | | |
|---|---|---|---|---|
| 1,261,442 A * | 4/1918 | Rigby | ........................ | 280/291 |
| 4,401,315 A * | 8/1983 | Pavincic | ..................... | 280/259 |
| 4,456,090 A | 6/1984 | Malenotti | | |
| 4,546,993 A | 10/1985 | Walker | | |
| 5,090,715 A | 2/1992 | Nakajima et al. | | |
| 5,720,359 A | 2/1998 | Attenello | | |
| 5,738,180 A * | 4/1998 | Hofmann et al. | ............ | 180/291 |
| 5,961,138 A * | 10/1999 | Roark et al. | ................. | 280/291 |
| 6,129,370 A * | 10/2000 | Hsieh et al. | ................. | 280/291 |
| 6,363,814 B1 * | 4/2002 | Pease | ........................... | 74/564 |
| D483,699 S * | 12/2003 | Anthony | ..................... | D12/114 |
| 6,663,129 B1 | 12/2003 | Smith | | |
| 6,719,316 B1 | 4/2004 | Anthony | | |
| D519,886 S * | 5/2006 | Colano | ........................ | D12/114 |
| D526,937 S * | 8/2006 | Colano | ........................ | D12/125 |
| D528,476 S * | 9/2006 | Stahel et al. | ................ | D12/114 |
| D531,092 S * | 10/2006 | Stahel et al. | ................ | D12/114 |
| 7,114,739 B2 * | 10/2006 | Colano | ......................... | 280/291 |
| D544,410 S * | 6/2007 | Johnson | ..................... | D12/114 |
| D560,562 S * | 1/2008 | Egan et al. | ................... | D12/114 |
| 2005/0204523 A1* | 9/2005 | Smith | ............................ | 24/633 |
| 2005/0241547 A1* | 11/2005 | Colano | ..................... | 108/50.14 |

* cited by examiner

*Primary Examiner*—Lesley D. Morris
*Assistant Examiner*—Tashiana Adams

(57) ABSTRACT

A motorcycle floorboard apparatus includes a panel that has a top surface, a bottom surface, a first lateral edge, a second lateral edge, a front edge and a rear edge. The bottom surface is removably attached to mounting supports attached to a motorcycle and the first lateral edge is positioned adjacent to the motorcycle. A plate is pivotally coupled to the second lateral edge. The plate lies within and is pivotable within a plane of the panel. The plate is selectively positionable in stored position extending along the second lateral edge or in an extended position extending outwardly away from the second lateral edge.

12 Claims, 3 Drawing Sheets

MOTORCYCLE FLOORBOARD APPARATUS

BACKGROUND OF THE INVENTION

1. Field of the Invention

The present invention relates to motorcycle floorboard devices and more particularly pertains to a new motorcycle floorboard device for that functions as a floorboard for a motorcycle but which may also be used as an extendable footrest extending outwardly from the motorcycle.

2. Description of the Prior Art

The use of motorcycle floorboard devices is known in the prior art. U.S. Pat. No. 6,719,316 describes a footrest and floorboard combination device. Another type of motorcycle floorboard device in U.S. Pat. No. 5,720,359 which is selectively adjustable. Still another such device is found in U.S. Pat. No. 5,090,715.

While these devices fulfill their respective, particular objectives and requirements, the need remains for a device that functions as and appears like a conventional floorboard for a motorcycle but which includes an articulated portion that acts as a footrest extending outwardly from the motorcycle. The device should also preferably include a locking means for selectively locking the articulated portion in a stored position or in an extended position.

SUMMARY OF THE INVENTION

The present invention meets the needs presented above by generally comprising a panel that has a top surface, a bottom surface, a first lateral edge, a second lateral edge, a front edge and a rear edge. The bottom surface is removably attached to mounting supports attached to a motorcycle and the first lateral edge is positioned adjacent to the motorcycle. A plate is pivotally coupled to the second lateral edge. The plate lies within and is pivotable within a plane of the panel. The plate is selectively positionable in stored position extending along the second lateral edge or in an extended position extending outwardly away from the second lateral edge.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
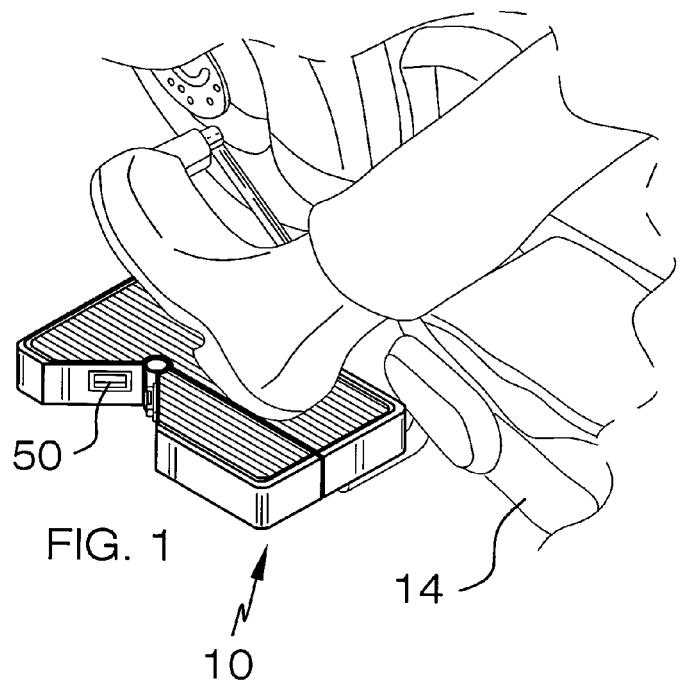
FIG. 1 is a perspective view of a motorcycle floorboard apparatus according to the present invention.

With reference now to the drawings, and in particular to FIGS. 1 through 6 thereof, a new motorcycle floorboard device embodying the principles and concepts of the present invention and generally designated by the reference numeral 10 will be described.

As best illustrated in FIGS. 1 through 6, the motorcycle floorboard apparatus 10 generally comprises an apparatus that is removably attached to mounting supports 12 on the motorcycle 14. The apparatus 10 includes a panel 16 having a top surface 18, a bottom surface 20, a first lateral edge 22, a second lateral edge 24, a front edge 26 and a rear edge 28. The bottom surface 20 is removably attached to the mounting supports 12 and the first lateral edge 22 is positioned adjacent to the motorcycle 14. The front edge 26 has a length from the first lateral edge 22 to the second lateral edge 24 that is greater than a length of the rear edge 28.

The second lateral edge 24 includes angled portion 30 positioned between a first perpendicular portion 32 and a second perpendicular portion 34. The first 32 and second 34 perpendicular portions are orientated substantially perpendicular to the front edge 26. The first perpendicular portion 32 abuts the front edge 26. A first angle formed at a juncture of the first perpendicular portion 32 and the angled portion 30 is between 110 degrees and 160 degrees. A second angle formed at a juncture of the second perpendicular portion 34 and the angled portion 30 is between 110 degrees and 160 degrees. A peripheral lip 36 is attached to and extends upwardly from a peripheral edge of the top surface 18 to help retain a foot on the top surface 18.

A plate 38 is pivotally coupled to the second lateral edge 24. The plate 38 lies within and is pivotable within a plane of the panel 16. The plate 38 includes forward edge 40, a rearward edge 42, a first side edge 44 and a second side edge 46. The plate 38 is selectively positionable in stored position extending along the second lateral edge 24 or in an extended position extending outwardly away from the second lateral edge 24. The stored position is defined when the first side 44 edge abuts the second lateral edge 34. The extended position is defined when the first side edge 44 is orientated substantially parallel to the rear edge 28. A juncture of the first side edge 44 and the forward edge 40 is pivotally coupled to the panel at a juncture of the second perpendicular portion 34 and the angled portion 30. An angle formed at the juncture of the first side edge 44 and the forward edge 40 is equal to the second angle minus 90 degrees. The first side edge 44 is orientated perpendicular to the second perpendicular portion 34 when the forward edge 40 is abutted against the angled portion 30. The rearward edge 42 is aligned with and orientated parallel to the rear edge 28 when the plate 38 is in the stored position.

A pair of locking members 48 is operationally mounted on the plate 38 and the panel 16 and is configured to releasably secure the plate 38 in the stored position or the extended position. Each of the locking members 48 includes a first mating portion 50 and a second mating portion 52. The first mating portions 50 are each attached to the panel 16 and each of the second mating portions 52 is attached to the plate 38. Each of the first mating portions 50 is alignable with and engaged to an associated one of the second mating portions 52 when the stored position or the extended position is achieved. The first mating portions 50 are preferably female couplers and the second mating portions 52 male couplers frictionally couplable with a corresponding one of the first mating portions 50.

Figure 2:
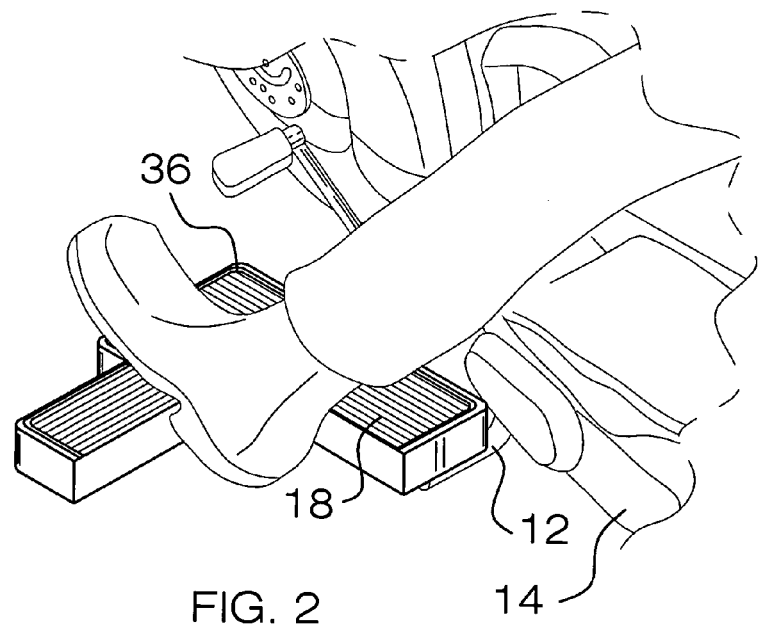
FIG. 2 is a perspective view of the present invention.
Figure 3:
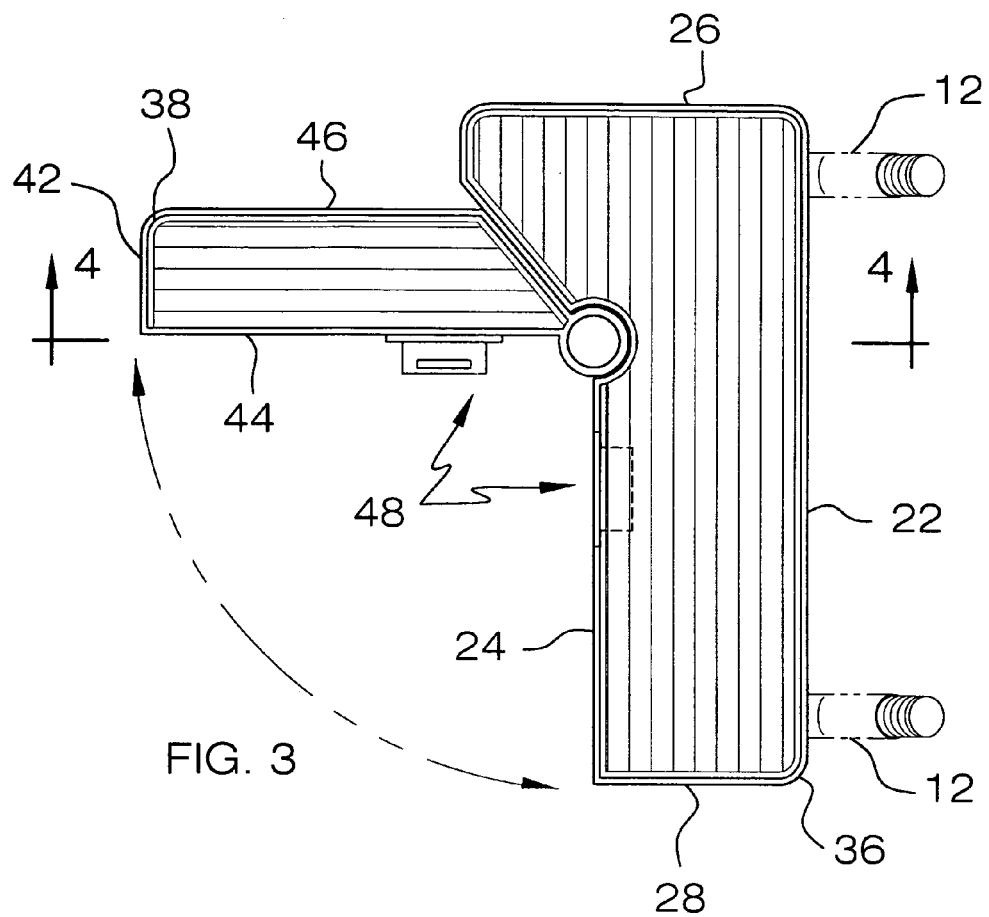
FIG. 3 is a top view of the present invention.
Figure 4:
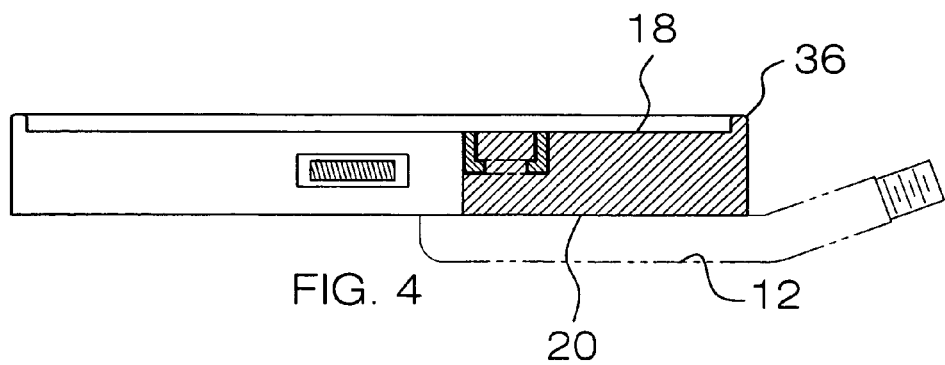
FIG. 4 is a cross-sectional view taken along line 4-4 of FIG. 3 of the present invention.
Figure 5:
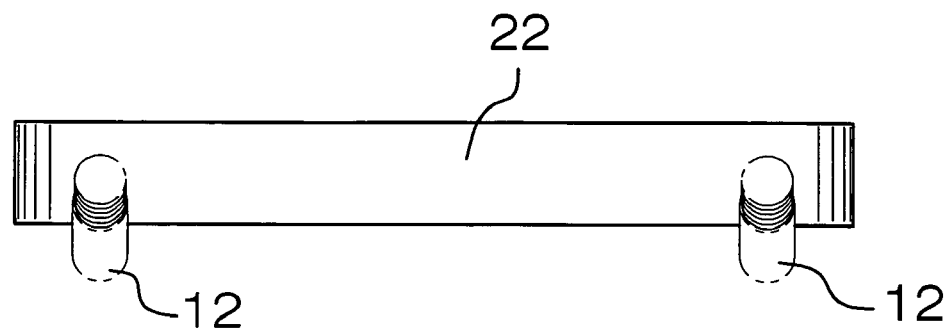
FIG. 5 is a side view of the present invention.
Figure 6:
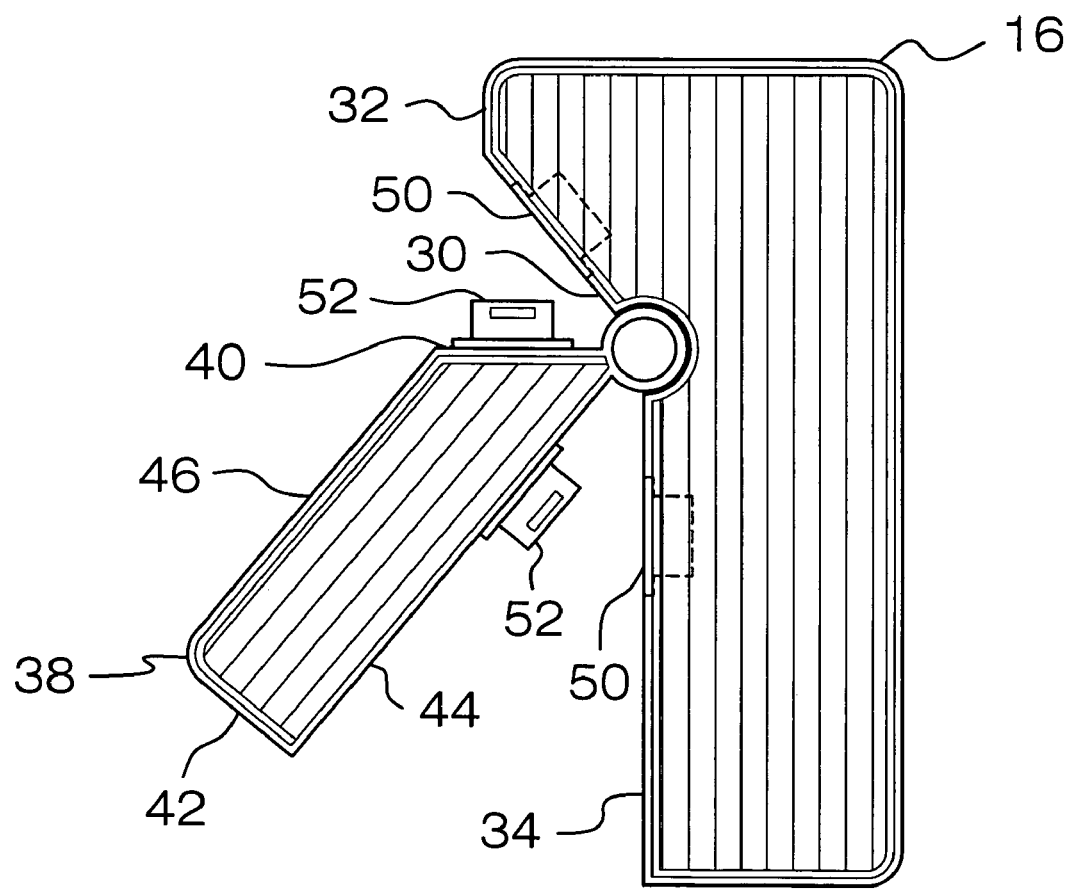
FIG. 6 is a top view of the present invention.

In use, the apparatus 10 functions as a floorboard for the motorcycle 14. However, when desired, the plate 38 may be extended outwardly from the panel to function as a footrest as shown in FIG. 2. The locking members 48 retain the plate 38 in a desired position.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An articulated motorcycle floorboard assembly, said assembly being removably attached to mounting supports on the motorcycle, said assembly comprising:

a panel having a top surface, a bottom surface, a first lateral edge, a second lateral edge, a front edge and a rear edge, said bottom surface being removably attached to the mounting supports and said first lateral edge being positioned adjacent to the motorcycle; and a plate being pivotably coupled to said second lateral edge, said plate lying and being pivotable within a plane of said panel, said plate being selectively positionable in stored position extending along said second lateral edge or in an extended position extending outwardly away from said second lateral edge.

2. The assembly according to claim 1, wherein said front edge has a length from said first lateral edge to said second lateral edge being greater than a length of said rear edge, said second lateral edge including angled portion positioned between a first perpendicular portion and a second perpendicular portion, said first and second perpendicular portions being orientated substantially perpendicular to said front edge, said first perpendicular portion abutting said front edge, said plate including forward edge, a rearward edge, a first side edge and a second side edge, a juncture of said first side edge and said forward edge being pivotally coupled to said panel at a juncture of said second perpendicular portion and said angled portion, said stored position being defined when said first side edge abuts said second lateral edge.

3. The assembly according to claim 2, wherein said extended position being defined when said first side edge is orientated substantially parallel to said rear edge.

4. The assembly according to claim 3, wherein a first angle formed at a juncture of said first perpendicular portion and said angled portion is between 110 degrees and 160 degrees, a second angle formed at a juncture of said second perpendicular portion and said angled portion being between 110 degrees and 160 degrees, an angle formed at said juncture of said first side edge and said forward edge being equal to said second angle minus 90 degrees, wherein said first side edge is orientated perpendicular to said second perpendicular portion when said forward edge is abutted against said angled portion.

5. The assembly according to claim 4, wherein said rearward edge is aligned with and orientated parallel to said rear edge when said plate is in said stored position.

6. The assembly according to claim 3, wherein said rearward edge is aligned with an orientated parallel to said rear edge when said plate is in said stored position.

7. The assembly according to claim 1, further including a peripheral lip being attached to and extending upwardly from a peripheral edge of said top surface.

8. The assembly according to claim 1, further including a pair of locking members operationally mounted on said plate and said panel and being configured to releasably secure said plate in said stored position or said extended position.

9. The assembly according to claim 8, wherein each of said locking members includes a first mating portion and a second mating portion, each of said first mating portions being attached to said panel and each of said second mating portions being attached to said plate, each of said first mating portions being alignable with and engaged to an associated one of said second mating portions when said stored position or said extended position is achieved.

10. An articulated motorcycle floorboard assembly, said assembly being removably attached to mounting supports on the motorcycle, said assembly comprising:

a panel having a top surface, a bottom surface, a first lateral edge, a second lateral edge, a front edge and a rear edge, said bottom surface being removably attached to the mounting supports and said first lateral edge being positioned adjacent to the motorcycle, said front edge having a length from said first lateral edge to said second lateral edge being greater than a length of said rear edge, said second lateral edge including angled portion positioned between a first perpendicular portion and a second perpendicular portion, said first and second perpendicular portions being orientated substantially perpendicular to said front edge, said first perpendicular portion abutting said front edge, a first angle formed at a juncture of said first perpendicular portion and said angled portion being between 110 degrees and 160 degrees, a second angle formed at a juncture of said second perpendicular portion and said angled portion being between 110 degrees and 160 degrees, a peripheral lip being attached to and extending upwardly from a peripheral edge of said top surface;

a plate being pivotally coupled to said second lateral edge, said plate lying and being pivotable within a plane of said panel, said plate including forward edge, a rearward edge, a first side edge and a second side edge, said plate being selectively positionable in stored position extending along said second lateral edge or in an extended position extending outwardly away from said second lateral edge, said stored position being defined when said first side edge abuts said second lateral edge, said extended position being defined when said first side edge is orientated substantially parallel to said rear edge, a juncture of said first side edge and said forward edge being pivotally coupled to said panel at a juncture of said second perpendicular portion and said angled portion, an angle formed at said juncture of said first side edge and said forward edge being equal to said second angle minus 90 degrees, wherein said first side edge is orientated perpendicular to said second perpendicular portion when said forward edge is abutted against said angled portion, said rearward edge being aligned with and orientated parallel to said rear edge when said plate is in said stored position;

a pair of locking members operationally mounted on said plate and said panel and being configured to releasably secure said plate in said stored position or said extended position, each of said locking members including a first mating portion and a second mating portion, each of said first mating portions being attached to said panel and each of said second mating portions being attached to said plate, each of said first mating portions being alignable with and engaged to an associated one of said second mating portions when said stored position or said extended position is achieved.

11. The assembly according to claim 10, wherein said plate has an upper surface being coplanar with said top surface of said panel.

12. The assembly according to claim 1, wherein said plate has an upper surface being coplanar with said top surface of said panel.

\* \* \* \* \*